Figure 1:
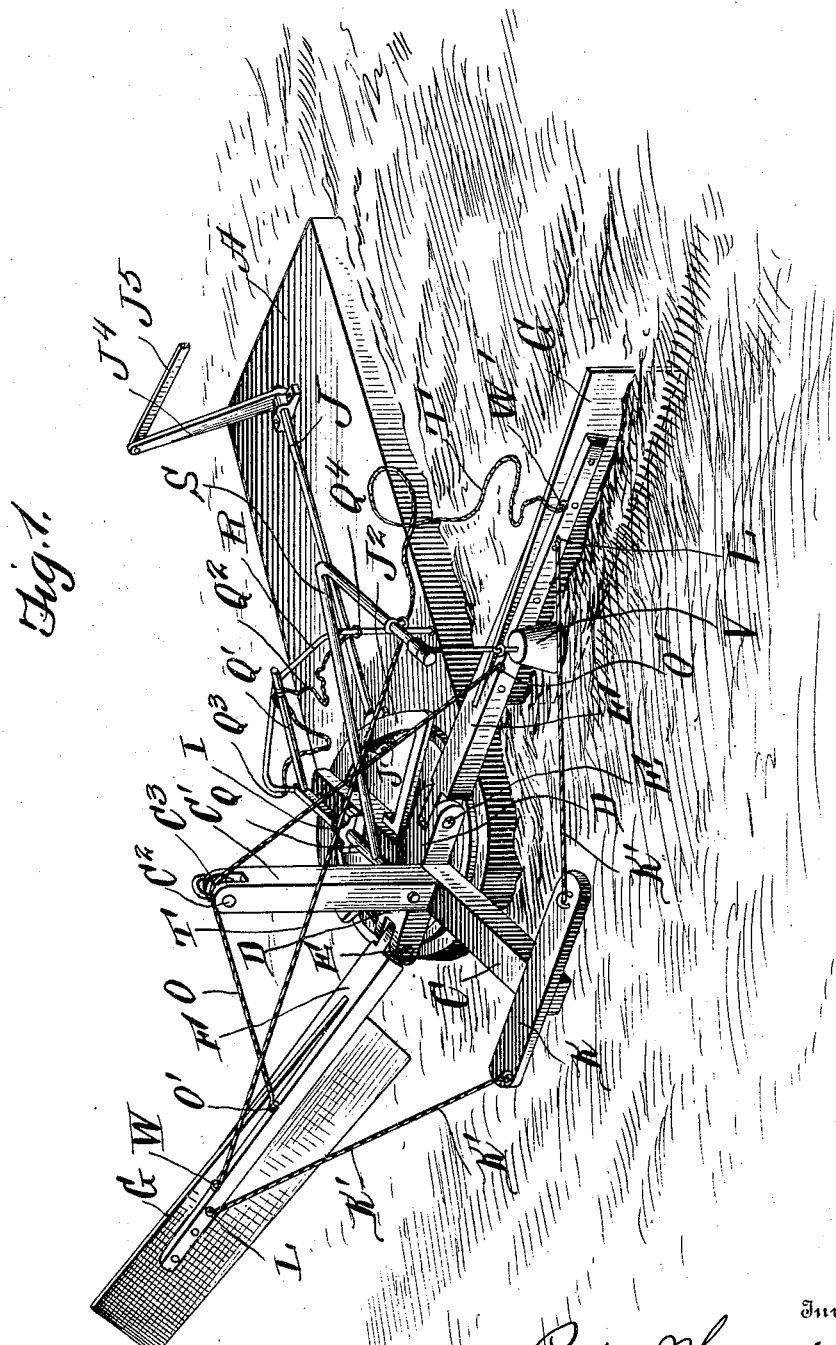

No. 793,722. PATENTED JULY 4, 1905.
P. HENRICHS.
CURRENT MOTOR.
APPLICATION FILED MAR. 27, 1905.

2 SHEETS—SHEET 1.

Witnesses
R. A. Boswell.
Clara S. Davenport

Inventor
Peter Henrichs,
By Franklin H. Hough
Attorney

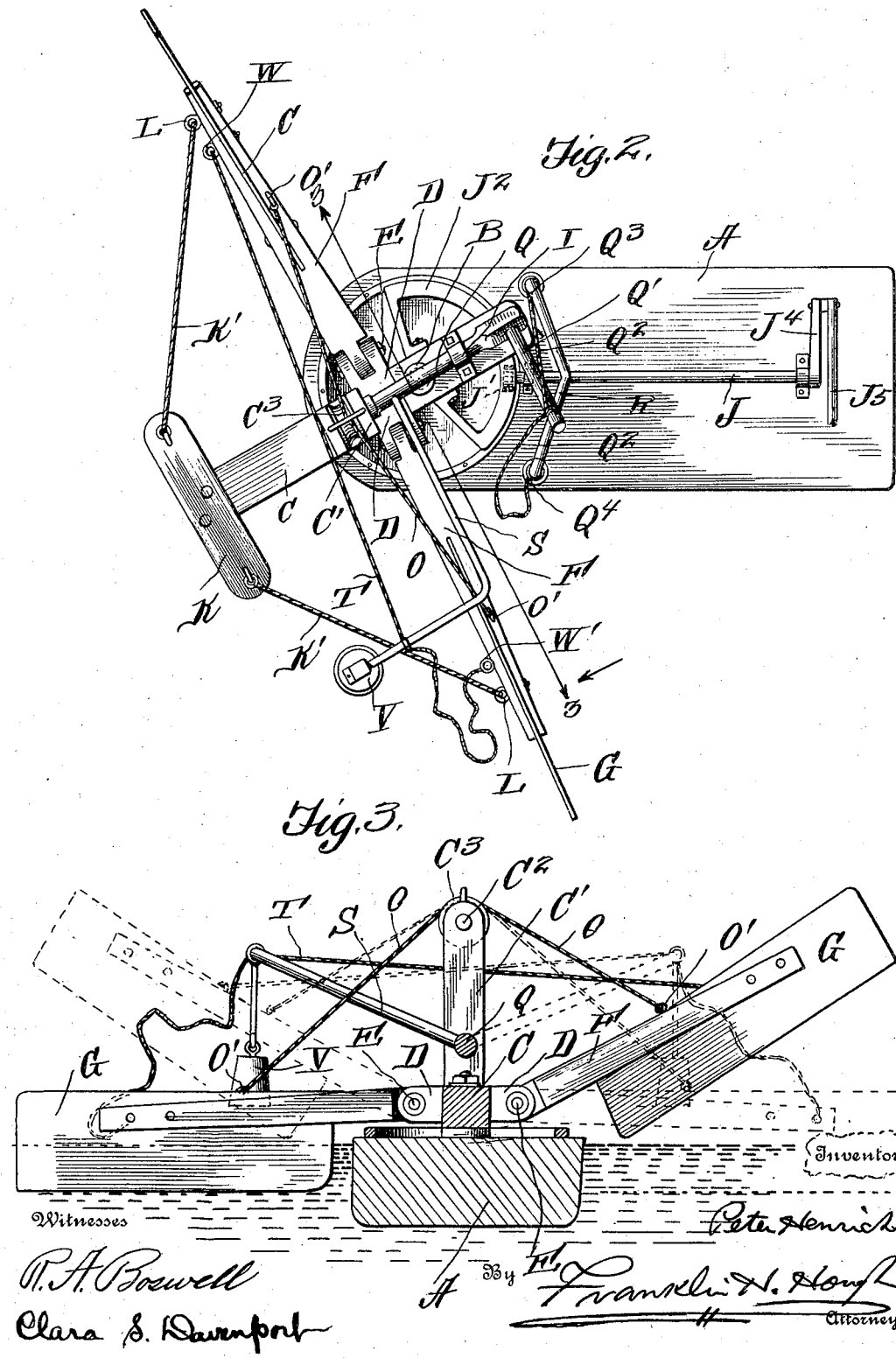

No. 793,722. Patented July 4, 1905.

UNITED STATES PATENT OFFICE.

PETER HENRICHS, OF CLARKSTON, WASHINGTON.

CURRENT-MOTOR.

SPECIFICATION forming part of Letters Patent No. 793,722, dated July 4, 1905.

Application filed March 27, 1905. Serial No. 252,300.

*To all whom it may concern:*

Be it known that I, PETER HENRICHS, a citizen of the United States, residing at Clarkston, in the county of Asotin and State of Washington, have invented certain new and useful Improvements in Current-Motors; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in current-motors designed especially for pumping water for irrigation purposes; and the object of the invention is to produce a simple and efficient device of this nature which may be mounted upon a float in a stream and so arranged that blades are thrown down into the current of water alternately first on one side of the float and then on the other for the purpose of furnishing power to operate a pump.

The invention consists, further, in certain combinations and arrangements of parts, which will be hereinafter fully described and then specifically defined in the appended claims, and is illustrated in the accompanying drawings, in which—

Figure 1 is a perspective view of my improved current-motor, showing one of the blades inserted in the water and being acted upon by a current, while the other is raised in position to return to its rearward position. Fig. 2 is a top plan view of the invention, and Fig. 3 is an end elevation.

Reference now being had to the details of the drawings by letter, A designates a float, which may be anchored in any suitable manner within a stream, and mounted upon said float is a pivotal pin B, as shown in Fig. 3 of the drawings, upon which the beam C is pivotally mounted. Said beam has laterally-projecting arms D, which are bifurcated and each of which carries a pivot-pin E, to which the contracted end of a blade-carrying strip F is pivoted. Said strips F are longitudinally slotted to receive the blades G, which are bolted or otherwise secured to said strips, and at the extreme forward end of the beam C is a cross-piece K, to which rods K' are fastened, which in turn are fastened to eyes L, mounted upon the sides of the strips F, thereby keeping the two blades at a fixed distance from the ends of the cross-piece K, while said blades are allowed to be raised and lowered in a manner which will be presently explained.

Rising from the beam C is a post C', carrying a pivot-pin $C^2$ in its upper bifurcated end, upon which pin a grooved pulley $C^3$ is journaled. A chain O is fastened at one end to an eye O' upon one of the strips F and passes over said pulley $C^3$, and its other end is fastened to a similar eye O' upon the opposite strip F.

Q designates a rock-shaft, one end of which is journaled in the post C' near its lower end, and said rock-shaft is journaled also in a bearing I and at its outer end has an arm Q' projecting at right angles therefrom, to which a chain $Q^2$ is fastened near the middle portion thereof, and one end of said chain is fastened at $Q^3$ to an upright portion of the arched rod R, while the other end of said chain is fastened at $Q^4$ to the opposite upright portion of said arched rod, as shown clearly in Fig. 1 of the drawings. By means of this chain it will be observed that the throw of the rock-shaft in one direction or the other may be limited.

A crank-arm S is also fastened to said rock-shaft at any suitable location and has secured thereto a cable or chain T, which latter is fastened near its middle portion to the angled end of said crank-arm S, one end of said cable or chain T being fastened to an eye W upon one of the strips F, while the other end of the chain is fastened at W' to the opposite strip F. A counterbalancing-weight V is fastened by a chain to the end of the crank-arm S.

Mounted in suitable bearings upon the top of the float is a shaft J, one end of which has a pinion-wheel J', adapted to mesh with teeth upon the under surface of the segment-rack $J^2$, whereby as the rack swings back and forth a rocking motion may be imparted to the shaft J and through said shaft to the crank-arm $J^4$ to a lever $J^5$, which may be connected by ratchet mechanism to a pumping apparatus.

The operation of my current-motor is as follows: One blade being lowered into the water in the manner shown in Fig. 1 of the drawings is carried by the current until one section of the chain $Q^2$ becomes taut, after which a further movement of the blade which is in the water will cause the rock-shaft to make a partial rotary movement by reason of the arm $Q'$ pulling upon the taut portion of the chain $Q^2$, which rocking motion of the shaft will cause the crank-arm to be raised with the weight thereon, and after the weight passes a vertical position it will fall by gravity from the opposite side of the beam C and cause the blade to be raised from the water. As the weight falls the adjacent blade will fall by gravity into the current and be carried by it and the operation is repeated, the counterbalancing-weight being first thrown to one side of the beam and then to the other and by so doing causing the blades to alternately dip into the current upon opposite sides of the float. The swinging movement of the beam, carrying the curved segment-rack therewith, will impart a rocking movement to the shaft J, and through its connections a pump (not shown) may be operated by the employment of a simple form of ratchet feeding device, thus affording a simple and efficient means for raising water for irrigating or other purposes.

While I have shown a particular form of apparatus illustrating my invention, it will be understood that I may vary the details of the same, if desired, without in any way departing from the spirit of the invention.

Having thus fully described my invention, what I claim as new, and desire to secure by Letters Patent, is—

1. A current-motor comprising a float, a swinging beam pivotally mounted thereon, hinged blades mounted upon said beam, a rock-shaft carried by the beam, a chain secured to a projection of said rock-shaft and provided at its ends with suitable anchorage, a counterbalancing-weight secured to said rock-shaft, connections between said counterbalancing-weight and blades, a rack carried by said beam, a shaft, and a pinion thereon meshing with said rack, as set forth.

2. A current-motor comprising a float, a swinging beam pivotally mounted thereon, hinged blades mounted upon said beam, a rock-shaft carried by the beam, a chain secured to a projection of said rock-shaft and provided at its ends with suitable anchorage, a counterbalancing-weight secured to said rock-shaft, a chain having connection with said counterbalancing-weight and its ends connected one to each of said blades, as set forth.

3. A current-motor comprising a float, a swinging beam pivotally mounted thereon, hinged blades mounted upon said beam, a rock-shaft carried by the beam, a chain secured to a projection of said rock-shaft and provided at its ends with suitable anchorage, a counterbalancing-weight secured to said rock-shaft, a chain having connection with said counterbalancing-weight and its ends connected one to each of said blades, a rack carried by said beam, a shaft, and a pinion thereon meshing with said rack, as set forth.

4. A current-motor comprising a float, a swinging arm pivotally mounted thereon, blades pivotally mounted upon projections of said beam, a post rising from the beam, a pulley carried by said post, a chain secured at its ends to said blades, a rock-shaft journaled in suitable bearings and having a projecting arm at one end, a chain secured to said arm and anchorage means to which the ends of said chain are connected, a crank-arm fastened to said rock-shaft, a counterbalancing-weight secured to the end of said crank-arm, a chain secured to said crank-arm and its ends fastened one to each of said blades, a rack secured to said beam, and a pinion in mesh with said rack and the shaft carrying said pinion, as set forth.

5. A current-motor comprising a float, a swinging arm pivotally mounted thereon, blades pivotally mounted upon projections of said beam, a post rising from the beam, a pulley carried by said post, a chain secured at its ends to said blades, a rock-shaft journaled in suitable bearings and having a projecting arm at one end, a chain secured to said arm and anchorage means to which the ends of said chain are connected, a crank-arm fastened to said rock-shaft, a counterbalancing-weight secured to the end of said crank-arm, a chain secured to said crank-arm and its ends fastened one to each of said blades, rods connecting said blades with a cross-piece at the end of said beam, a rack secured to said beam, and a pinion meshing with said rack and the shaft carrying said beam, as set forth.

In testimony whereof I hereunto affix my signature in presence of two witnesses.

PETER HENRICHS.

Witnesses:
W. M. CLEMENSON,
WM. RUTLEDGE.